United States Patent
Koike et al.

(10) Patent No.: US 11,092,738 B2
(45) Date of Patent: Aug. 17, 2021

(54) OPTICAL FIBER CABLE

(71) Applicants: Yasuhiro Koike, Yokohama (JP);
NITTO DENKO CORPORATION, Osaka (JP)

(72) Inventors: Yasuhiro Koike, Yokohama (JP);
Azusa Inoue, Tokyo (JP)

(73) Assignees: NITTO DENKO CORPORATION, Ibaraki (JP); Yasuhiro Koike, Yokohama (JP)

( * ) Notice: Subject to any disclaimer, the term of this patent is extended or adjusted under 35 U.S.C. 154(b) by 0 days.

(21) Appl. No.: 16/645,854

(22) PCT Filed: Sep. 11, 2018

(86) PCT No.: PCT/JP2018/033637
§ 371 (c)(1),
(2) Date: Mar. 10, 2020

(87) PCT Pub. No.: WO2019/050045
PCT Pub. Date: Mar. 14, 2019

(65) Prior Publication Data
US 2020/0264365 A1    Aug. 20, 2020

(30) Foreign Application Priority Data
Sep. 11, 2017  (JP) .............................. JP2017-174197

(51) Int. Cl.
*G02B 6/028* (2006.01)
*G02B 6/02* (2006.01)

(52) U.S. Cl.
CPC .......... *G02B 6/028* (2013.01); *G02B 6/02038* (2013.01)

(58) Field of Classification Search
None
See application file for complete search history.

(56) References Cited

U.S. PATENT DOCUMENTS

| 5,818,630 A | 10/1998 | Fermann et al. |
| 5,827,611 A * | 10/1998 | Forbes ..................... D01D 5/34 428/375 |

(Continued)

FOREIGN PATENT DOCUMENTS

| JP | 2003-14992 A | 1/2003 |
| JP | 2011-55016 A | 3/2011 |
| JP | 2017-167405 A | 9/2017 |

OTHER PUBLICATIONS

Inoue, A. et al.; "Reflection noise reduction effect of graded-index plastic optical fiber in multimode fiber link", Optics Letters, Jun. 15, 2014, vol. 39, No. 12, pp. 3662-3665 (4 pages), cited in ISR.

(Continued)

*Primary Examiner* — Jerry Rahll
(74) *Attorney, Agent, or Firm* — Westerman, Hattori, Daniels & Adrian, LLP (57) ABSTRACT

Provided is an optical fiber cable which allows for high-quality signal transmission in short-distance transmission. The optical fiber cable is designed for use in optical communication based on transmitting an optical beam from a light-emitting device, to a light-receiving device. The optical fiber cable has: a proximal end which is one end thereof on the side of the light-emitting device, and a distal end which is the other end thereof on the side of the light-receiving device, wherein an optical beam returning from the side of the distal end toward the side of the light-emitting device has an $M^2$ factor of 1.7 or more; and a length of 50 m or less.

4 Claims, 3 Drawing Sheets

(56) References Cited

U.S. PATENT DOCUMENTS

2003/0001164 A1  1/2003  Fujihara et al.
2003/0185530 A1  10/2003 White
2005/0062181 A1  3/2005  Walker
2005/0185530 A1  8/2005  Akanuma

OTHER PUBLICATIONS

International Search Report dated Nov. 6, 2018, issued in counterpart International Application No. PCT/JP2018/033637 (2 pages).
Extended (Supplementary) European Search Report dated Apr. 22, 2021, issued in counterpart EP Application No. 18853694.0. (6 pages).
Office Action dated Jul. 5, 2021, issued in counterpart JP application No. 2017-174197, with English translation. (9 pages).

* cited by examiner

OPTICAL FIBER CABLE

TECHNICAL FIELD

The present invention relates to an optical fiber cable. In particular, the present invention relates to an optical fiber cable allowing for high-quality signal transmission in short-distance transmission.

BACKGROUND ART

Heretofore, an optical fiber has been developed and used for the purpose of allowing for high-speed communication over a longer distance in middle-and long-distance trunk systems.

On the other hand, mainly for the purpose of short-range communication over 100 m or less between video devices at home or the like, electric cables including HDMI have been used.

Recently, in transmission of high-capacity data such as 4K or 8K images with which practical broadcasting is planned, an insufficient transmission capacity of an electric cable, an increase in power consumption and an increase in electromagnetic noise have been becoming serious problems. Therefore, it has been considered to use an optical fiber capable of transmitting a large-capacity communication signal, in short-distance transmission including consumer optical communications at home.

However, it has been revealed that, when a conventional optical fiber is used in such short-distance transmission at home or the like, a radically new noise-related problem which has almost not been taken into consideration occurs to cause difficulty in high-quality high-speed signal transmission, due to an influence of the resulting noise.

Some semiconductor laser modules for use in optical communication systems employ an optical isolator for attenuating reflected return light from an optical fiber to reduce a possibility that noise is generated by the reflected return light.

JP 2003-014992A discloses a semiconductor laser module employing an optical isolator, wherein a polarizer is disposed such that a polarization plane thereof is coincident with a polarization plane of emitted light, thereby attenuating reflected return light by both the polarizer and the optical isolator.

CITATION LIST

[Parent Document]
Patent Document 1: JP 2003-014992A

SUMMARY OF INVENTION

Technical Problem

However, conventional techniques are intended to reduce the influence of return light from an optical fiber by adding a device such as an optical isolator or a polarizer, but there has not been made an attempt to solve the return light-based problem by properties of an optical fiber cable itself.

The present invention is directed to providing an optical fiber cable allowing for high-quality signal transmission in short-distance transmission.

Solution to Technical Problem

The present inventors focused on an influence on signal transmission in an optical link for short-distance communication (short-distance communication optical link), caused by a phenomenon that return light from afar destabilizes a light-emitting device.

Figure 1:
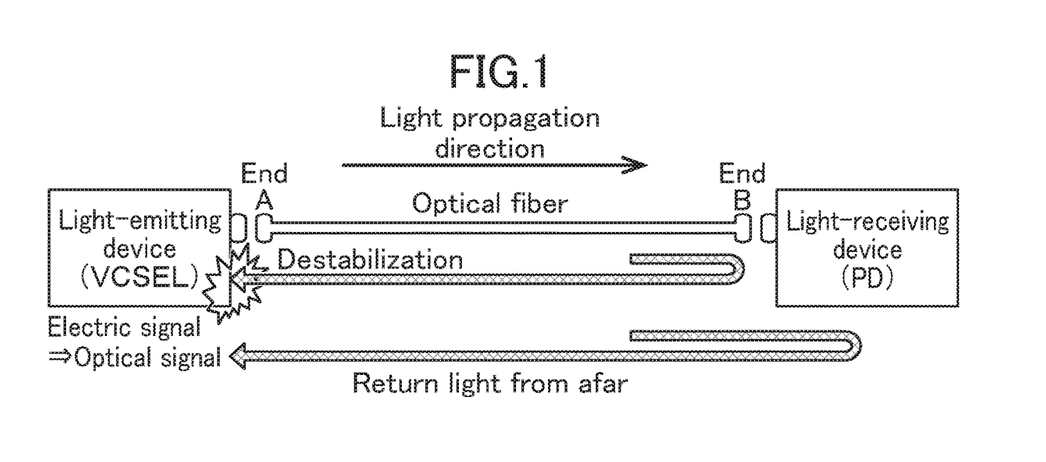
FIG. 1 is a schematic conceptual diagram of a short-distance communication optical link using the optical fiber cable of the present invention.

FIG. 1 is a schematic conceptual diagram of a short-distance communication optical link using the optical fiber cable of the present invention. In FIG. 1, light emitted from a light-emitting device such as a vertical cavity surface emitting laser (VCSEL) to enter an optical fiber through a proximal end (end A) thereof, i.e., one end thereof on the side of the light-emitting device, and propagated through the optical fiber, is partly reflected on the side of a distal end (end B) of the optical fiber, i.e., the other end on the side of a light-receiving device (specifically, reflected by the end B, the light-receiving device (photodiode (PD)), a connector, or the like), to return to the side of the light-emitting device. The above return light from afar means such resulting light. It is conceivable that the light returning to the side of the light-emitting device also includes return light from the vicinity of the light-emitting device (the end A or the like). However, such return light from the vicinity is considered not to be a factor causing the light-emitting device to be destabilized.

As a result of diligent researches, the present inventors obtained a finding that a fluctuation having a lower frequency than a relaxation frequency of a light-emitting device, caused by return light from afar, is a main causal factor of deterioration in transmission quality, particularly in short-distance transmission.

As a factor representing properties of an optical fiber cable capable of reducing return light from afar, the present inventors also focused on an $M^2$ factor which has been conventionally used as a parameter representing the quality of an optical beam.

The $M^2$ factor is a parameter indicative of equality regarding the degree of focusing of an optical beam, expressed as the following formula (1) using a wavelength $\lambda$, a beam radius W (D4σ) defined using a secondary moment, and a beam spread angle $\theta$, on the basis of a Gaussian beam ($TEM_{00}$ mode).

$$M^2 = \frac{\pi W \theta}{\lambda} \quad (1)$$

Here, the beam radius W (D4σ) can be obtained from a near field pattern (NFP) of output laser light, and the beam spread angle $\theta$ (half angle) can be obtained from a far field pattern (FFP) of the laser light. In an ideal Gaussian beam, the $M^2$ factor is 1.

In laser light output from an optical fiber, the value of the $M^2$ factor thereof depends on a propagation mode. In a single-mode optical fiber, a propagable guided mode is one ($HE_{11}$ mode), so that the $M^2$ factor does not change with the length of the optical fiber due to light scattering or the like. On the other hand, in a multi-mode optical fiber in which there are plural propagation modes simultaneously, the $M^2$ factor of output light is equal to that of a superimposed mode based on the plural propagation modes different in the $M^2$ factor, wherein, as a higher-order mode component is increased (the focusability becomes worse) due to mode coupling caused by light scattering, the $M^2$ factor of the output light becomes larger, i.e., the beam quality becomes worse. As a result, a radiation loss becomes larger, and it becomes impossible to receive the entire output light from the optical fiber, thereby leading to deterioration in light signal transmission quality. Therefore, it was believed that, from a viewpoint of maintaining the light signal transmission quality, it is important to set, to a sufficiently small value, the $M^2$ factor of laser light output from a multi-mode optical fiber.

As diligent researches about allowing the $M^2$ factor conventionally used as a parameter representing the quality of a laser beam to be used as a design value of a multi-mode optical fiber, the present inventor obtained a finding that the influence of return light from afar can be reduced, particularly in short-distance communication, by using an optical fiber cable whose $M^2$ factor is controlled to a specific value.

Although not restricted by any theory, it is considered that, in a case where an optical fiber has a microscopic non-uniform structure having a correlation length of about several hundred angstroms, it becomes possible to increase mode coupling caused by forward scattering, and effectively control the $M^2$ factor of light output from the optical fiber, while controlling a propagation loss. It is considered that, by using an optical fiber cable whose $M^2$ factor is controlled to a specific value, a decrease in noise by a decrease in the influence of reflected return light from afar becomes more dominant than a transmission loss occurring along with an increase in a higher-order mode due to mode coupling Specifically, the present invention provides an optical fiber cable for use in optical communication based on transmitting an optical beam from a light-emitting device, to a light-receiving device, wherein the optical fiber cable has: a proximal end which is one end thereof on the side of the light-emitting device, and a distal end which is the other end thereof on the side of the light-receiving device, wherein an optical beam returning from the side of the distal end toward the side of the light-emitting device has an $M^2$ factor of 1.7 or more; and a length of 100 m or less.

Preferably, in the optical fiber cable of the present invention, the $M^2$ factor of the optical beam is 5.0 or less.

The optical fiber cable of the present invention may comprise a graded index (GI)-type optical fiber.

The optical fiber cable of the present invention may comprise a plastic optical fiber (POF).

In this case, a core material for the plastic optical fiber (POF) preferably includes a perfluorinated material, a partially fluorinated material, a partially chlorinated material, and a partially deuterated material.

In this case, the core material may comprise a dopant.

Effect of Invention

The present invention allows for high-quality signal transmission, particularly in short-distance transmission.

DESCRIPTION OF EMBODIMENTS

A plastic optical fiber (POF) is an optical fiber in which both a core and a cladding thereof are made of a plastic material, and the most distinctive feature thereof is that it is flexible, thereby being strong in bending, and has a large diameter, thereby allowing easy connection, as compared with a quartz-based optical fiber. Further, an optical fiber is classified into a step-index (SI) type whose core has a uniform refractive index, and a graded-index (GI) type whose core has a refractive-index distribution, wherein the SI type optical fiber is unsuitable for high-speed communication, because, in this optical fiber, a propagation time period varies depending on optical pathways (modes), leading to spreading of signal pulses, whereas the GI type optical fiber allows for high-speed communication with a transmission speed far exceeding a gigabit per second, because, in this optical fiber, a difference in propagation time period is significantly reduced by the refractive index distribution.

The optical fiber of the present invention is configured such that return light from afar has an $M^2$ factor of 1.7 or more.

Figure 2:
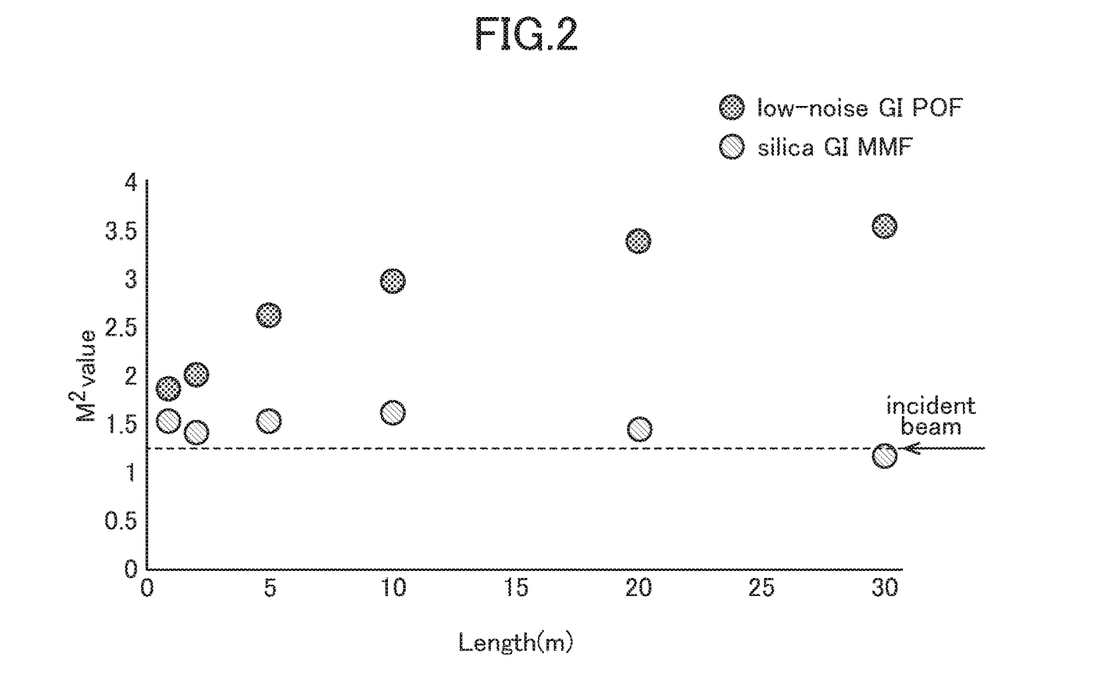
FIG. 2 is graph showing a comparison between respective $M^2$ factors of a multi-mode optical fiber according to one embodiment of the present invention and a conventional multi-mode optical fiber.

FIG. 2 comparatively shows respective $M^2$ factors of a multi-mode optical fiber according to one embodiment of the present invention and a conventional multi-mode optical fiber, evaluated under axial excitation with a linearly-polarized approximate Gaussian beam. An entering light source is a linearly-polarized single frequency laser (DBR85manufactured by Thorlabs, Inc.) configured to emit laser light from a polarization-maintaining single-mode optical fiber (SMF) pigtail. The emitted light from the fiber pigtail is collimated and condensed through lenses, and entered into an evaluation optical fiber in alignment with a central axis thereof. This experimental system makes it possible to measure, from the lowest-order mode which can be approximated to an Gaussian beam to be excited during the entry, a temporal change in the $M^2$ factor caused by mode coupling via light scattering, and use the obtained measurement result as an index representing a noise reduction effect of the present invention. Further, an emitting edge face of the pigtail is formed as an angled physical contact (APC) connector, so as to prevent laser light from being destabilized, so that it becomes possible to measure the $M^2$ factor in a stable state. In FIG. 2, the horizontal axis represents the length of the optical fiber, and the vertical axis represents the $M^2$ factor.

In the conventional optical fiber, the $M^2$ factor exhibits an approximately constant value in the range of about 1.3 to 1.5, irrespective of the length of the optical fiber. On the other hand, in the optical fiber of the present invention, the $M^2$ factor is 1.7 or more, wherein the $M^2$ factor becomes larger as the length of the optical fiber becomes larger.

Heretofore, mainly in the field of laser processing, it has been believed that, from a viewpoint of obtaining a stable and high-quality output optical beam without dependence on the length of an optical fiber, etc., it is desirable for the $M^2$ factor of an optical fiber to have a small value as much as possible and not to become larger even as the length of the optical fiber becomes larger. In an optical communication optical fiber cable using a multi-mode optical fiber, the same properties are required, because an increase in the $M^2$ factor naturally leads to an increase in transmission loss. The present inventors have found that, surprisingly, in short-distance transmission using a multi-mode optical fiber, rather when the $M^2$ factor is relatively large, the influence of reflected return light from afar is reduced more dominantly than a transmission loss, thereby providing improved transmission quality.

The magnitude or value of the $M^2$ factor can be controlled by the type of a material constituting a core of an optical fiber, a refractive-index distribution of the core, and manufacturing conditions for the optical fiber. Further, depending on a laser radius and an entry condition of a laser beam to be used, the value of the $M^2$ factor of the fiber output light measured according to the above experimental system and evaluation conditions can be used as a criterion to perform the evaluation and control of the $M^2$ factor in a microscopic non-uniform structure, with excellent reproducibility. A possible factor causing a variation of the $M^2$ factor is basically not an optical system. Specifically, even when the radius of a laser beam changes, a divergent angle is narrowed or widened such that a product of them is kept constant, and therefore there is no influence on the $M^2$ factor. Thus, the possible factor causing a variation of the $M^2$ factor is considered to be only wavelength.

The optical fiber cable of the present invention is configured such that return light from afar has an $M^2$ factor of 1.7 or more, as measured under the condition that the length of the optical fiber cable is set to a lower limit of a length allowing an optical fiber to be practically used. If the $M^2$ factor is less than 1.7, the transmission quality is undesirably deteriorated due to influence of reflected return light.

Further, the optical fiber cable of the present invention has a length of 100 m or less, wherein the $M^2$ factor of the return light from afar as measured under the condition that the length of the optical fiber cable is set to an upper limit of the length allowing an optical fiber to be practically used is preferably 5.0 or less. If the $M^2$ factor is greater than 5.0, the transmission loss is undesirably increased due to an increase in higher-order modes.

The length of the optical fiber cable of the present invention is 100 m or less. If the length is greater than 100 m, the influence of a scattering loss due to forward scattering is undesirably increased more dominantly than the return light reduction effect, and, rather, the transmission quality is deteriorated.

As mentioned above, the value of the $M^2$ factor of the optical fiber cable of the present invention can be obtained by adjusting the type of the core material and the optical fiber manufacturing conditions.

Specifically, as a means to increase the $M^2$ factor, it is conceivable to, e.g., form a core of an optical fiber to have a microscopic non-uniform structure having a correlation length of about several hundred angstroms. This makes it possible to increase forward scattering different from so-called Rayleigh scattering which is observed in a quartz-based glassy optical fiber. As a result, it becomes possible to induce effective mode coupling to reduce noise, while controlling the transmission loss.

For example, in an acrylic-based polymer, there are intramolecular and intermolecular interactions based on an ester group existing in each molecule. On the other hand, such an ester group does not exist in a perfluorinated polymer such as dioxolane. Thus, the intramolecular and intermolecular interactions are weaker than those in the acrylic-based polymer. Based on this difference, the conformation of a polymer chain itself can be changed to control the size of the non-uniform structure and a reflective index fluctuation. In any case, a polymer is an assembly of coiled molecules generally having an inertial radius of several hundred angstroms, whereas the microscopic non-uniform structure does not exist in quart glass devoid of such molecules.

In a case where a fluorine-containing polymer (including a perfluorinated material, and a partially fluorinated material) is used as a core material for the optical fiber, it can be synthesized in the following manner.

Synthesis Example A

Synthesis Method for Perfluorinated Material

Generally, it is possible to use, as the perfluorinated material, TEFRON-AF (product name of DuPont), Hyflon AD (product name of DuPont), and CYTOP (product name of Asahi Glass Co., Ltd). A perfluorinated polymer obtained by copolymerizing tetrafluoroethylene or the like with a cyclic main chain structure of each of the above perfluorinated material may also be used. Further, it is possible to use a perfluorinated polymer having a dioxolane skeleton. A syntheses method for the perfluorinated polymer having the dioxolane skeleton will be described below.

A polymer constituting each of a core and a cladding of the optical fiber of the present invention can be produced by any heretofore-known method in this field. Examples of the method include subjecting a mixture of monomers constituting the polymer to solution polymerization, bulk polymerization, emulsion polymerization or suspension polymerization. Among them, bulk polymerization is preferable from a viewpoint of preventing incorporation of foreign substances and impurities.

A polymerization temperature in the above process is not particularly limited. For example, it is suitably set in the range of about 80 to 150° C. A reaction time period may be appropriately adjusted according to the amount and type of each of the monomers, the amount of each of the after-mentioned polymerization initiator, chain transfer agent and others, the reaction temperature, etc., wherein it is suitably set in the range of about 20 to 60 hours. Such a polymer may be simultaneously or continuously produced during the after-mentioned formation of the core and/or cladding.

Examples of the polymer constituting the core include: (meth)acrylic acid ester-based compounds such as ethyl methacrylate, n-propyl methacrylate, n-butyl methacrylate, ethyl acrylate, n-propyl acrylate, and n-butyl acrylate; styrene-based compounds such as styrene, alpha-methylstyrene, chlorostyrene, and bromostyrene; vinylesters such as vinyl acetate, vinyl benzoate, vinylphenyl acetate, and vinyl chloroacetate; and maleimides such as N-n-butylmaleimide, N-tert-butylmaleimide, N-isopropylmaleimide, and N-cyclohexylmaleimide; and a substance subjected to substitution of a part of hydrogen atoms in C—H bonds of each of these monomers by a chlorine, fluorine or deuterium atom.

In production of the above polymer, it is preferable to use a polymerization initiator and/or a chain transfer agent. The polymerization initiator may include a commonly-used radical initiator. Specific examples thereof include: peroxide-based compounds such as benzoyl peroxide, t-butylperoxy-2-ethylhexanate, di-t-butylperoxide, t-butylperoxyisopropylcarbonate, and n-butyl 4,4-bis(t-butylperoxy)valerate; and azo-based compounds such as 2, 2'-azobisisobutyronitrile, 2, 2'-azobis (2-methylbutyronitrile), 1, 1'-azobis (cyclohexane-1-carbonitrile), 1,1'-azobis (2-methylpropane), 2, 2'-azobis(2-methylpropane), 2, 2-azobis (2-methylbutane), 2, 2'-azobis(2-methylpentane), 2, 2'-azobis(2, 3-dimethylbutane), 2, 2'-azobis(2-methylhexane), 2, 2'-azobis(2, 4-dimethylpentane), 2, 2'-azobis(2, 3, 3-trimethylbutane), 2, 2'-azobis(2,4, 4-trimethylpentane), 3,3'-azobis(3-methylpentane), 3,3'-azobis(3-methylhexane), 3,3'-azobis(3, 4-dimethylpentane), 3,3'-azobis(3-ethyl pentane), dimethyl-2,2'-azobis (2-methylpropionate), diethyl-2, 2'-azobis (2-methylpropionate), and di-t-butyl-2,2'-azobis (2-methylpropionate). These may be used independently or in the form of a combination of two or more of them.

The polymerization initiator is suitably used in an amount of about 0.01 to 2 weight % with respect to the total amount of the monomers. The chain transfer agent is not particularly limited, but any heretofore-known chain transfer agent may be used. Examples thereof include: alkyl mercaptans (n-butylmercaptan, n-methylmercaptan, n-octylmercaptan, n-laurylmercaptan, and t-dodecylmercaptan); and thiophenols (thiophenol, m-bromothiophenol, p-bromothiophenol, m-toluenethiol, and p-toluenethiol). Among them, alkyl mercaptan such as n-butylmercaptan, n-octylmercaptan, n-laurylmercaptan or t-dodecylmercaptan is suitably used. Further, it is possible to use a chain transfer agent subjected to substitution of a hydrogen atom in a C—H bond by a deuterium or fluorine atom. These may be used independently or in the form of a combination of two or more of them.

Generally, the chain transfer agent is used to adjust the molecular weight to an appropriate value in terms of shaping and physical properties. A chain transfer constant of the chain transfer agent for each monomer can be experimentally determined by reference to e.g., "Polymer Handbook, 3rd Edition" (Authors: J. Brandrup and E. H. Immergut, Publisher: John Wiley and Sons Inc.) and "Experimental Methods for Polymer Synthesis" (Authors: Takayuki Otsu and Masayoshi KINOSHITA, Publisher: Kagakudojin. Co. Ltd., Publication Date: 1972). Thus, it is preferable to appropriately adjust the type and additive amount of the chain transfer agent, depending on the type, etc., of each monomer and in view of the chain transfer constant. For example, the chain transfer agent may be added in an amount of about 0.1 to 4 weight parts with respect to 100 weight parts as the total monomer component.

A weight-average molecular weight of the polymer constituting the core and/or the cladding suitably is suitably set in the range of about 50,000 to 300,000, preferably in the range of about 100,000 to 250,000. This is aimed at ensuring appropriate flexibility and transparency. The core and the cladding may be different from each other in terms of molecular weight, due to, e.g., viscosity adjustment, etc. For example, the weight-average molecular weight means a polystyrene-equivalent value measured by gel permeation chromatography (GPC).

An additive agent such as a thermostabilization aid, a processing aid, a heat resistance improver, an antioxidant or a light stabilizer may be added to the polymer constituting the optical fiber of the present invention, as needed basis, without spoiling required performance of an optical fiber such as transparency and heat resistance. These may be used independently or in the form of a combination of two or more of them, and examples of a method of mixing these additive agent with the monomers or the polymer include a hot blend method, a cold blend method, and a solution mixing method.

<Synthesis of perfluoro-4-methyl-2-methylene-1,3-dioxolane>

2-chloro-1-propanol, 1-chloro-2-propanol and methyl trifluoropyruvate were subjected to a dehydration condensation reaction to obtain a purified product of 2-carbomethyl-2-trifluoromethyl-4-methyl-1,3-dioxolane. Subsequently, fluorination of perfluoro-4-methyl-2-methylene-1,3-dioxolane was performed. Specifically, under the condition that 1,1,2-trichlorotrifluoroethane was used as a solvent, and each of nitrogen gas and fluorine gas was supplied to a reaction container at a constant flow rate, the previously-prepared 2-carbomethyl-2-trifluoromethyl-4-methyl-1,3-dioxolane was slowly added to the reaction container in a nitrogen-fluorine atmosphere, so as to be subjected to fluorination treatment to obtain perfluoro-2,4-dimethyl-1,3-dioxolane-2-carboxylic acid. The resulting distillation product was neutralized by a potassium hydroxide aqueous solution to obtain perfluoro-2,4-dimethyl-2-potassium carboxylate-1,3-dioxolane. This potassium salt was dried in a vacuum, and decomposed in an argon atmosphere to obtain perfluoro-4-methyl-2-methylene-1,3-dioxolane. A mixture of the obtained perfluoro-4-methyl-2-methylene-1,3-dioxolane and perfluorobenzoyl peroxide was put in a glass tube, and degassed using a vacuum freezing-unfreezing machine. Then, after refilling argon, the resulting mixture was heated for several hours. The content was formed as a solid, so that a transparent polymer was obtained. An optical fiber was produced using this polymer.

Preferably, the viscosity of the fluorine-containing polymer (including perfluorinated and partially fluorinated materials) in a molten state is $10^3$ to $10^5$ P as measured at a melting temperature of 200 to 300° C. If the melt viscosity is excessively high, it causes difficulty in melt-spinning. Moreover, dopant diffusion necessary for forming a refractive-index distribution becomes less likely to occur, leading to difficulty in formation of the refractive-index distribution. On the other hand. If the melt viscosity is excessively low, a problem arises in terms of practical use. That is, in a case where such an optical fiber is used as a light transmitting body in an electronic device, an automobile or the like, it is softened due to exposure to high temperatures, resulting in deterioration in light transmission performance.

A number-average molecular weight of the fluorine-containing polymer is preferably 10,000 to 5000,000, more preferably 50,000 to 1000,000. If the number-average molecular weight is excessively small, heat resistance is likely to be spoiled. On the other hand, if the number-average molecular weight is excessively large, it undesirably causes difficulty in forming a light transmitting body having a refractive-index distribution.

In a case where a partially chlorinated material is used as the core material for the optical fiber, it can be synthesized by the same syntheses method as that for the perfluorinated material as a commonly-used production method.

Synthesis Example B

Synthesis of Partially Chlorinated Material (see JP 5419815B)

A production method for the partially chlorinated material will be briefly described below. Trichloroethyl methacrylate preliminarily purified by distillation, cyclohexylmaleimide preliminarily purified by sublimation, and diphenyl sulfide which is a dopant serving as a refractive index imparting agent were subjected to precise weight measurement, individually, and put in a glass container. Further, di-tert-butylperoxide serving as the polymerization initiator and n-laurylmercaptan serving as the chain transfer agent were added such that respective concentrations thereof become given values with respect to the total weight. After sufficiently mixing the mixture, the resulting solution was passed through and filtered by a membrane filter having a given pore size, and the filtered solution was put in a glass polymerization container. Subsequently, while argon gas is introducing into the glass polymerization container containing the filtered solution, dissolved air was removed therefrom by a freezing degassing method. Subsequently, after placing this glass polymerization container in an oven, the temperature of the polymerization container was raised under introduction of argon gas to promote polymerization of the monomers, and then further raised to complete the polymerization reaction. Subsequently, the glass polymerization container was opened to obtain a solidified transparent polymer rod.

When a solubility parameter of the dopant is equal to that of the polymer and indicates a good compatibility, the dopant uniformly exists in a matrix of the polymer. On the other hand, as a difference in the solubility parameter between the dopant and the polymer becomes larger, dopant particles increasingly tends to be aggregated together, so that a refractive index non-uniform structure is formed according to a concentration distribution of the dopant. In addition to the above finding regarding a commonly-known solubility parameter, by adding a local interaction between the dopant and the polymer (e.g., a secondary electron polarization equivalent to an interaction between specific functional groups), a microscopic concentration distribution of the dopant can be formed. As the dopant for the perfluorinated core material, a substance having a higher refractive index than that of the perfluorinated polymer is generally used. Specifically, the dopant substance is a substance substantially having no C—H bond for the same reason as that in the perfluorinated material, and preferably has a larger refractive index than that of the perfluorinated polymer by 0.05 or more. When the dopant has a larger refractive index, the content of the dopant required for forming a desired refractive index distribution can be reduced, which makes it possible to reduce lowering of the glass-transition temperature thereof, and thereby enhance the heat resistance of the optical fiber. It is particularly preferable that the refractive index of the dopant is greater than that of the perfluorinated polymer by 0.1 or more.

It is preferable to use, as the dopant, a low-molecular compound, an oligomer or a polymer which comprises an aromatic ring such as a benzene ring, a halogen atom such as a chlorine, bromine or iodine atom, and a bonding group such as an ether bonding group. In case of a polymer, when the molecular weight becomes larger, compatibility with the perfluorinated polymer is deteriorated, thereby leading to an increase in light scattering loss. Thus, a polymer having a large molecular weight is not very favorable. On the other hand, in a compound having a small molecular weight, the glass-transition temperature of a mixture with the fluorine-containing polymer is lowered, which poses a factor causing lowering of a heat-resistant temperature of the optical fiber. Thus, a polymer having an excessively small molecular weight is unfavorable. Therefore, the number-average molecular weight of the dopant is preferably $3 \times 10^2$ to $2 \times 10^3$, more preferably $3 \times 10^2$ to $1 \times 10^3$.

Specific examples of a compound of the dopant include: an oligomer which is a pentamer to an octamer of chlorotrifluoroethylene, and an oligomer which is a pentamer to an octamer of dichlorodifluoroethylene, as described in JP H08-005848A; and an oligomer which a dimer to a pentamer obtained by polymerizing a monomer (e.g., a monomer having a chlorine atom) capable of providing an oligomer having a relatively high refractive index among monomers for forming the perfluorinated polymer.

In addition to halogenated aliphatic group-containing compounds like the above oligomers, it is possible to use a halogenated aromatic hydrocarbon compound and a halogen-containing polycyclic compound each devoid of a hydrogen atom bonded to a carbon atom. In particular, a fluorinated aromatic hydrocarbon compound or a fluorine-containing polycyclic compound each containing only a fluorine atom as a hydrogen atom (or containing a relatively small number of chlorine atoms with respect to the number of hydrogen atoms) is preferable from a viewpoint of compatibility with the fluorine-containing polymer. Further, it is more preferable that the halogenated aromatic hydrocarbon compound or the halogen-containing polycyclic compound is free of a polar functional group such as a carbonyl group or a cyano group.

For example, such a halogenated aromatic hydrocarbon compound includes a compound representing the following formula: $\Phi r\text{-}Zb$ (where: $\Phi_r$ denotes an b-valent fluorinated aromatic residue subjected to substitution of all hydrogen atoms by fluorine atoms; and Z denotes a halogen atom other than a fluorine atom, —Rf, —C—Rf, —O—RF, or —C—N, where: Rf denotes a perfluoroalkyl group, a polyfluoroperhaloalkyl group, or a univalent $\Phi r$; and b denotes an integer of 0 or 1 or more). An aromatic ring includes a benzene ring and a naphthalene ring. Preferably, a carbon number in the perfluoroalkyl group or the polyfluoroperhaloalkyl group as Rf is 5 or less. Preferably, the halogen atom other than a fluorine atom is a chlorine atom or a bromine atom. Specific examples of the compound include 1-3-dibromotetrafluorobenzene, 1, 4-dibromotetrafluorobenzene, 2-bromotetrafluorobenzotrifluoride, clopentafluorobenzene, bromopentafluorobenzene, iodopentafluorobenzene, decafluorobenzophenone, perfluoroacetophenone, perfluorobiphenyl, chloroheptafluoronaphthalene, and bromoheptafluoronaphthalene. From a viewpoint of having good compatible with the perfluorinated polymer, particularly a fluorine-containing polymer whose main chain has a ring or cyclic structure, and good heat resistance, a particularly preferable dopant as an example of the halogen-containing polycyclic compound includes a chlorotrifluoroethylene oligomer, perfluoro (triphenyltriazine), perfluoroterphenyl, perfluoroquattrophenyl, perfluoro (triphenylbenzene), and perfluoroanthracene. Based on such good compatible, the dopant substance can be easily mixed with the fluorine-containing polymer, particularly a fluorine-containing polymer whose main chain has a ring or cyclic structure, through heat melting at 200 to 300° C. Alternatively, the dopant and the polymer may be uniformly mixed by dissolving and mixing them in a fluorine-containing solvent, and removing the solvent.

A dopant to be used with a partially chlorinated or partially fluorinated core material includes a low-molecular-weight compound, and a compound subjected to substitution of a hydrogen atom existing in the low-molecular-weight compound by a deuterium atom. Examples of a low-molecular-weight compound having a relatively high refractive index include: Sulfur compounds such as diphenyl sulfone (DPSO) and diphenyl sulfone derivatives (e.g., diphenyl sulfone chloride such as 4,4-dichlorodiphenyl sulfone, or 3,3', 4,4'-tetrachlorodiphenyl sulfone), diphenyl sulfide (DPS), diphenylsulfoxide, dibenzothiophene, and dithiane derivatives; phosphate compounds such as triphenyl phosphate (TPP), and tricresyl phosphate; benzyl benzoate; benzyl n-butyl phthalate; diphenyl phthalate; biphenyl; and diphenylmethane. Examples of a low-molecular-weight compound having a relatively low refractive index include tris-2-ethylhexyl phosphate (TOP). These may be used independently or in the form of a combination of two or more of them.

A temperature and/or a spinning speed during spinning of the optical fiber may be controlled to make it easier to produce a microscopic non-uniform structure so as to allow the $M^2$ factor of the optical fiber cable to become a desirable value. A preform method and a melt extrusion method are well known as commonly-used methods for an optical fiber using the perfluorinated polymer. The preform method comprises: preparing two rod-shaped molded plastic bodies, each called "rod", as a core and a cladding, respectively, wherein the cladding rod is formed to have a hollow portion; centrally disposing the core rod and integrating the cladding rod with the core rod to cover the outer periphery of the core rod, thereby producing a rod-like body, called "preform"; setting the preform in a commonly-used spinning apparatus to uniformly heat and melt the outer periphery of the preform by a tubular heater or the like, and draw and stretch a distal end of the preform at a constant speed to form a fiber, whereafter the resulting fiber is cooled and reeled.

On the other hand, the melt extrusion method comprises: filling a polymer preliminarily incorporating a dopant in a given amount and serving as a core polymer, and a dopant-free polymer serving as a cladding polymer, into two commonly-used melt extruders, respectively; and converging respective melt polymers from the melt extruders and coextruding the melt polymers from a nozzle, thereby obtaining an optical fiber. Generally, an extruder equipped with a screw may be used. Alternatively, an extruder configured to extrude melt polymers by a pressure of nitrogen gas or the like. Further, a covering layer may be additionally provided, as needed basis.

The microscopic non-uniform structure can be formed through a heat treatment process to be performed after coextruding the melt core polymer and the melt cladding polymer. For example, quenching or rapid cooling may be performed just after the coextrusion. In this case, the coextruded polymers are transformed into a glassy state while keeping a larger volume, before enthalpy relaxation occurs in the polymers. On the other hand, when a sufficient heat treatment process is performed around the glass-transition temperature, the volume of the polymers slightly decreases due to enthalpy relaxation. In a case where the enthalpy relaxation occurs in a microscopic region, the so-called "microscopic non-uniform structure" is formed to cause an increase in the $M^2$ factor. Further, after the coextrusion, a stretching process may be added. In this case, molecules of the melt-extruded fiber are subjected to orientation, and orientation birefringence arises depending on the degree of the orientation. In this orientation birefringence, birefringence arises not only in an axial direction of the fiber but also eventually in a radial direction and a peculiar direction of the fiber. This birefringence structure also functions to promote mode coupling and thus increase the $M^2$ factor.

As a method of manufacturing the optical fiber of the present invention, it is possible to use any method heretofore known in this field. For example, in order to form a single-layer or multi-layer cladding around the outer periphery of a single-layer or multi-layer core, it is possible to use an interfacial gel polymerization method, a rotational polymerization method, a melt extrusion dopant diffusion method, a composite melt spinning method, a rod-in-tube method, etc. Further, a preform may be preliminarily form, and subjected to stretching, wiredrawing, or the like.

Specifically, the manufacturing method method may comprise: producing a hollow cladding; and producing a core in a hollow portion of the cladding. In this case, a monomer constituting the core is introduced into the hollow portion of the cladding, and polymerized under rotation of the cladding, to form a polymer serving as the core such that it has a higher refractive index than that of the cladding. This operation may be performed only once to form a single-layer core, or may be repeated to form a multi-layer core.

As a polymerization container for use in the polymerization, it is possible to use a cylindrical tube-shaped container (tube) made of glass, plastic or metal and having mechanical strength capable of withstanding an external force such as a centrifugal force caused by rotation and heat resistance during the thermal polymerization. For example, a rotation speed of the polymerization container during the polymerization may be about 500 to 3000 rpm. Generally, it is preferable to introduce the monomer into the polymerization container after subjecting the monomer to filtering to remove grit and dust contained in the monomer.

Alternatively, the manufacturing method may be configured to form the core and the cladding, using two or more melt intruders, a multi-layer forming die, and a multi-layer spinning nozzle. Specifically, polymers each constituting a respective one of the core and cladding are melted by heating, and introduced to the multi-layer forming die and the multi-layer spinning nozzle via individual flow passages. Through the die and the nozzle, the core is extrusion-molded and simultaneously a single-layer or multi-layer cladding is concentrically extrusion-molded around the outer periphery of the core, so that they can be integrally fusion-bonded to form a fiber or a preform.

Here, as a means to form a GI-type refractive index distribution in an optical fiber, it is possible to exemplify: an interfacial gel polymerization method comprising: adding a dopant under the condition that a monomer composition ratio is maintained constant; subjecting a monomer to bulk polymerization at an interface with a polymer (cladding); and giving a concentration distribution of the dopant based on a reaction of the bulk polymerization; a rotating gel polymerization method in which the reaction mechanism of the interfacial gel polymerization is performed by a rotational polymerization method; and a method comprising performing rotational polymerization such that a monomer composition ratio is gradually changed to prepare a plurality of monomers different in refractive index, i.e., the polymerization rate of a preceding layer is controlled (the polymerization rate is set to a relatively low value) and a subsequent layer is polymerized to have a higher refractive index, so as to form a refractive index distribution in which the refractive index is gradually increased from the interface with the cladding toward the center of the core, as described in, e.g., WO93/008488A.

Further, it is also possible to exemplify: a melt extrusion dopant diffusion method comprising: forming a core and a cladding, using two or more melt intruders, a multi-layer forming die, and a multi-layer spinning nozzle; and, in a subsequent heat treatment zone, diffusing a dopant toward a peripheral or central region of the core to form a distribution of the dopant; and a method comprising introducing two or more polymers containing a dopant in different amounts, respectively to two or more melt intruders to extrusion-mold a core and/or a cladding to have a multi-layer structure.

In a case where it is necessary to form an SI-type refractive index distribution, it is desirable to perform a rotational polymerization method or the like under the condition that the monomer composition ratio and/or the dopant addition amount are maintained constant from start to finish. In a case where it is necessary to form a multi-step refractive index distribution, it is preferable to perform a rotational polymerization method or the like, wherein the polymerization rate of a preceding layer is controlled (the polymerization rate is set to a relatively high value) and a subsequent layer is polymerized to have a higher refractive index.

Production Example

A GI-POF was produced using the polymer rod synthesized in the above manner (with regard to a production apparatus, refer to JP 5514802B). This production is based on a method of obtaining an optical fiber by the melt extrusion dopant diffusion method. The polymer rod produced in the above Synthesis Example was set in a center core cavity of a melt extruder. Further, a dried polymethyl methacrylate (PMMA) resin for a cladding was filled in a hopper of a cladding extruder. Similarly, a dried polycarbonate (PC) resin for a covering layer as an outermost layer was filled in a hopper of an over-cladding extruder. The polymers filled in the core cavity, a cladding cavity and an over-cladding cavity of the respective extruders were heated. A nitrogen gas pressure was applied to an upstream end of the core cavity, and a pressure generated by a screw of each of the cladding and over-cladding extruders is applied to the resin filled in a corresponding one of the cladding cavity and the over-cladding cavity, thereby coextruding the three types of polymers from a nozzle. In this way, a melt extrusion spinning processing was performed to form a three-layer structure to obtain a GI-POF.

In the optical fiber of the present invention, it is preferable to form the cladding using the same material as that of the core. However, the cladding may be formed from a material different from that of the core.

In the optical fiber of the present invention, a protective covering layer may be additionally provided outside an outer layer (cladding layer). A material for the protective covering layer is not particularly limited as long as it is a synthetic resin, and may be a hardened material of a thermoplastic resin or a hardening resin which is a material other than the perfluorinated polymer. Among them, it is preferable to user a synthetic resin which has heretofore been used or proposed to be used as a protective covering layer of an optical fiber. In a case where it is required to increase mechanical strength as a role for the protective covering layer, a layer having a certain level or more of thickness is needed, and a synthetic resin having high tensile strength or high elastic modulus is preferably used. As a material for the protective covering layer, a thermoplastic resin is preferable. In the thermoplastic resin, an acrylic resin, a polycarbonate resin, and a cyclic polyolefin resin are particularly preferable. This protective covering layer may have a multi-layer structure, and one of the layers may be made from a relatively soft thermoplastic resin such as a vinyl chloride resin, a polyolefin resin, a polyvinylidene fluoride resin, or an ethylene-tetrafluoroethylene copolymer resin.

As a light-emitting device, a VCSEL, an edge emitting laser or the like capable of gigabit-order data transmission is used. In this type of laser, there is always a problem with reflected return light.

Mainly, a GaAs PIN PD is used in conformity to a laser wavelength and a transmission rate. Although an antireflective (AR) coating is generally applied on the PD, it is impossible to completely eliminate the reflection by the PD. This poses one factor causing destabilization of the laser.

A bit error rate (BER) is the number of bit errors to the total number of bits of a transmission signal in a digital communication system, and is generally used as an index representing quality of a transmission system. Due to a decrease in signal level or an increase in noise level, the transmission quality is deteriorated, and the BER is increased. This shows that, as long as the value of the BER is sufficiently low it is possible to perform the transmission without problem, even in a situation where there is noise.

EXAMPLES

The present invention will be specifically described below by taking some examples. However, it should be understood that the present invention is not limited to the following examples.

Synthesis Example 1

Synthesis Method for POF Material using Partially Fluorinated Material

A core rod and a hollow-structured cladding rod were separately produced, and then the hollow-structured cladding rod was inserted over the outer periphery of the core rod to produce a preform.

In production of the core rod, firstly, hexafluoroisopropyl α-fluoroacrylate as a partially fluorinated derivative of methyl methacrylate was used as a monomer material. This material is liquid at normal temperature. 10 g of the material was filled in a vial tube having an inner diameter of 5 cm and a length of 7 cm. Further, each of a dopant, a polymerization initiator and a chain transfer agent was added in a required amount. The amounts of the dopant, the polymerization initiator and the chain transfer agent were set, respectively, to 8.0 mol %, 0.1 mol % and 0.1 mol %. A material used as the dopant was decaflourobipheny. Tert-butyl peroxy-2-ethylhexanoate was used as the polymerization initiator, and butyl mercaptan was used as the chain transfer agent. The mixture prepared in the above manner was sufficiently stirred, and the resulting solution was transferred to an ampule tube having an inner diameter of 1 cm and a length of 30 cm. Then, this ample with the solution was set in a freezing degassing apparatus to remove dissolved oxygen. Subsequently, an upper end of the ample tube was sealed in a depressurized state. The resulting ample was immersed in an oil bath at 60° C. for 24 hours, then at 80° C. for 24 hours, and finally at 120° C. for 24 hours, to induce a polymerization reaction. Subsequently, the ample tube was unsealed to extract a solidified sample. This sample was used as a core rod.

Next, a cladding hollow tube was produced. Specifically, a polymethylmethacrylate (PMMA) hollow tube having an outer diameter of 2.2 cm, an inner diameter of 1.1 cm and a length of 60 cm was produced by a well-known method, using a commercially-available acrylic resin (methyl methacrylate (MAA) resin).

The previously produced core rod and this hollow tube were cut into the same length (in this example, about 20 cm). Then, the core rod was inserted into the hollow tube, and two fluorine resin caps were put, respectively, on opposite ends of the resulting assembly. Further, the assembly was entirely covered by a heat-shrinkable tube, and heated in an oven at 160° C. for two days. After completion of the heating, the heat-shrinkable tube was removed to obtain a preform.

Synthesis Example 2

Synthesis Method for Perfluorinated Material 139 g of a mixture of 2-chloro-1-propanol, 1-chloro-2-propanol and methyl trifluoropyruvate was put in a flask, and methyl trifluoropyruvate was added thereto to obtain 230 g of a purified product of 2-carbomethyl-2-trifluoromethyl-4-methyl-1,3 -dioxolane. Subsequently, fluorination of perfluoro-4-methyl-2-methylene-1,3-dioxolane was performed. Specifically, under the condition that 1,1,2-trichlorotrifluoroethane was used as a solvent, and nitrogen gas and fluorine gas was supplied to a reaction container, respectively, at a constant flow rate of 1340 cc/min and at a constant flow rate of 580 cc/min, 230 g of the previously-prepared 2-carbomethyl-2-trifluoromethyl-4-methyl-1,3 -dioxolane was slowly added to the reaction container in a nitrogen-fluorine atmosphere, so as to be subjected to fluorination treatment to obtain 150 g of perfluoro-2,4-dimethyl-1,3-dioxolane-2-carboxylic acid. A fluorination yield in this step was about 85%. The resulting product was neutralized by a potassium hydroxide aqueous solution to obtain perfluoro-2,4-dimethyl-2-potassium carboxylate-1,3-dioxolane. This potassium salt was dried in a vacuum, and decomposed in an argon atmosphere to obtain perfluoro-4-methyl-2-methylene-1,3-dioxolane. A mixture of the obtained perfluoro-4-methyl-2-methylene-1,3-dioxolane and perfluorobenzoyl peroxide was put in a glass tube, and degassed using a vacuum freezing-unfreezing machine. Then, after refilling argon, the resulting mixture was heated for several hours. The content was formed as a solid, so that about 120 g of a transparent polymer was obtained. An optical fiber was produced using this polymer.

Production Example 1

Production Method for GI-POF using Partially Fluorinated Material

An optical fiber was produced by the aforementioned preform method, using the preform obtained in Synthesis Example 1. Specifically, the preform was set in a commonly-used spinning apparatus, and melted and stretched at 210° C. to obtain a GI-POF having a length of 200 m, an outer diameter of about 500 μm and a core diameter of 80 μm.

This long fiber was cut into 1 m (Inventive Example 1), 10 m (Inventive Example 2), and 30 m (Inventive Example 3), and each sample was evaluated. Further, an optical fiber cable produced in the same manner as that in Inventive Example 1 except that the length thereof was set to 60 m (Inventive Example 4) was subjected to the same evaluation.

Production Example 2

Production Method for POF Material and GI-POF Using Perfluorinated Material

An optical fiber was produced by the melt extrusion dopant diffusion method.

The perfluoro-4-methyl-2-methylene-1,3-dioxolane synthesized in Synthesis Example 2 and 5 weight % of 1, 1, 3, 5, 5-pentachloroperfluorohexane serving as a dopant were put in a container and mixed together. The resulting mixture was heated to about 200° C., and the contents of the mixture were uniformly melted under sufficient stirring. Subsequently, the mixture were cooled and solidified. The resulting solid was extracted from the contained to obtain a core member.

Further, the perfluoro-4-methyl-2-methylene-1,3-dioxolane synthesized in Synthesis Example 2 was heated and melted at about 200° C. in a container, and then cooled and solidified. The resulting solid was extracted from the contained to obtain a cladding member.

Using the obtained core member and cladding member, and further an over-cladding member, a GI-POF was produced through the use of a melt extrusion dopant diffusion apparatus capable of obtaining a three-later structure. As the over-cladding member, XYLEX X7300CL (product name; manufactured by SABIC Innovative Plastics; polyester modified polycarbonate resin) was used after drying. The core member, the cladding member and the over-cladding member are put in respective hoppers of given extruders. The resins were melted by heating respective flow passage of a core cavity, a cladding cavity and an over-cladding cavity, and the melted resins were converged and extruded from a nozzle in the form of a three-layer structure, thereby obtaining an optical fiber. As a result, a GI-POF having a length of 200 m, an outer diameter of about 500 μm and a core diameter of 50 μm was obtained.

This long fiber was cut into 1 m (Inventive Example 5), 2 m (Inventive Example 6), 5 m (Inventive Example 7), 10 m (Inventive Example 8), 20 m (Inventive Example 9), and 30 m (Inventive Example 10), and each sample was evaluated.

Evaluation Method 1

Measurement Method for NFP and FFP

Figure 3:
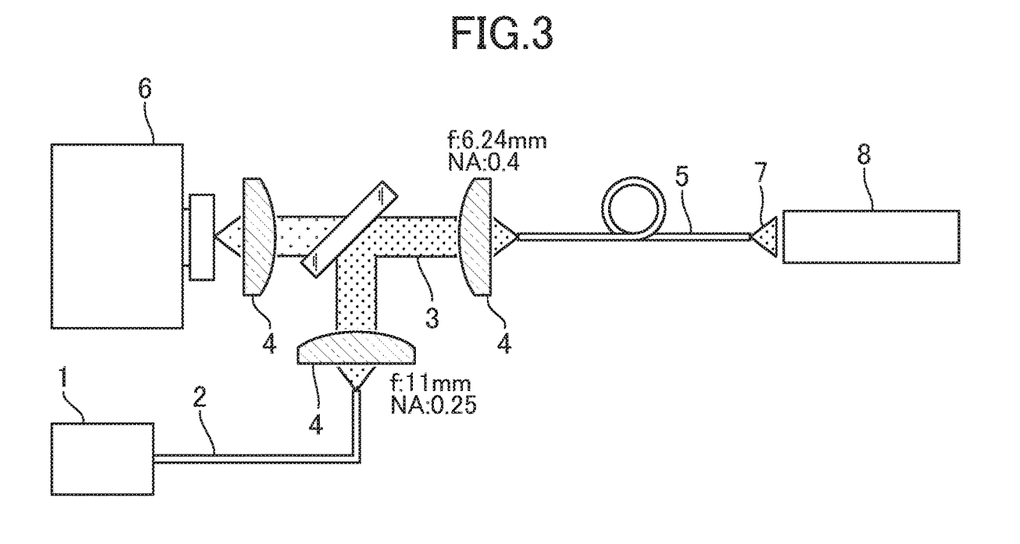
FIG. 3 is a schematic conceptual diagram of a measurement system for determining $M^2$ factors of optical fiber cables employed in Inventive Examples.

A measurement system for NFP and FFP is shown in FIG. 3.

Light (3) (mode field diameter: 5.3 μm) emitted from a (APC polished) pigtail of a polarization-maintaining single-mode optical fiber (2) of a single frequency distributed Bragg reflector (DBR) laser (1) having a center frequency of 850 nm) was entered into an optical fiber (5) using a lens (4). In this process, based on microscopic observation by a CCD camera (6), the emitted light is adjusted such that it enters in alignment with a central axis of a core of the optical fiber via the lens (4), and the evaluation is performed under an axial excitation condition. Then, NFP and FFP of light (7) output from an end on the side opposite to a receiving end of the optical fiber were measured, respectively, by an NFP measuring device (A6501 manufactured by Hamamatsu Photonics K.K.) (8) and a FFP measuring device (A3267 manufactured by Hamamatsu Photonics K.K.) (12), to determine a beam diameter W (Dσ4) and a spread angle θ (half-angle) defined using a secondary moment.

Evaluation Method 2

Measurement Method for BER

Figure 4:
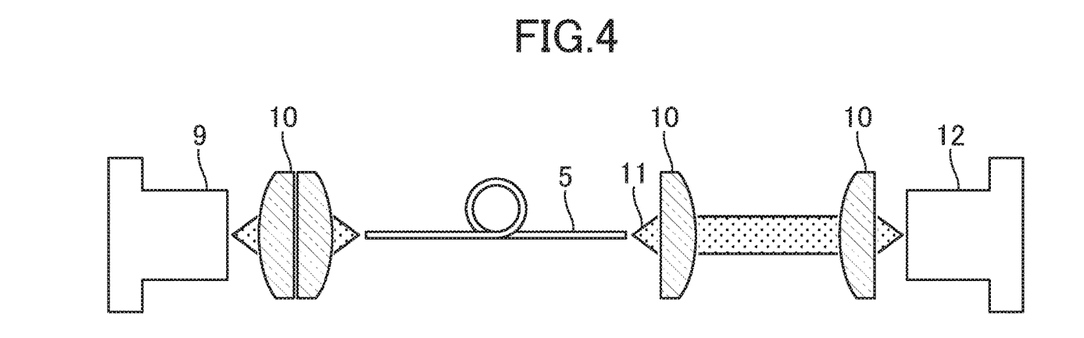
FIG. 4 is a schematic conceptual diagram of a measurement system for measuring bit error rates (BERs) regarding the optical fiber cables employed in Inventive Examples.

A measurement system for BER is shown in FIG. 4.

A surface-emitting laser (VCSEL manufactured by Philips) having an oscillation wavelength of 850 nm and a transmission rate of 14 Gb/s was directly modulated by a 10 Gb/s non-return-to-zero (NRZ) pseudo random pattern generated by a built-in pulse pattern generator of a bit error rate tester (BERT) (MP2010A manufactured by ANRITSU Corporation) and having a pattern length of $2^{31}$-1. The voltage of a modulation signal was set to 0.1 V (peak-to-peak value), and a bias current of VCSEL was set to 5 mA). Light emitted from the laser is entered in alignment with the core axis of the optical fiber (5) via an aspheric lens pair (10) without causing any input coupling less except for Fresnel reflection loss, and the evaluation is performed under axial excitation. Then, light (11) output from an end on the side opposite to a receiving end of the optical fiber was received by a 14 Gb/s photodiode (12) (manufactured by Philips) via an aspheric lens pair without causing any coupling less except for Fresnel reflection loss, and then connected to a BERT through a coaxial cable to measure BRT (bit error rate) by a built-in error detector of the BERT.

COMPARATIVE EXAMPLES

As quartz-based glass, OM4_TIA/EIA 492-AAAD (manufactured by Corning Inc.) was prepared, and, a sample having a length of 1 m (Comparative Example 1), a sample having a length of 2 m (Comparative Example 2), a sample having a length of 5 m (Comparative Example 3), a sample having a length of 10 m (Comparative Example 4), a sample having a length of 20 m (Comparative Example 5), and a sample having a length of 30 m (Comparative Example 5) were subjected to the same evaluations as those of the Inventive Examples. A result of measurement of the $M^2$ factor is shown in Table 1.

TABLE 1

|  |  | Core material | Fiber length (m) | $M^2$ factor |
|---|---|---|---|---|
| Inventive Examples | 1 | GI-POF of partially fluorinated material | 1 | 2.0 |
|  | 2 |  | 10 | 4.0 |
|  | 3 |  | 30 | 5.0 |
|  | 4 |  | 60 | 5.1 |
|  | 5 | GI-POF of perfluorinated material | 1 | 1.8 |
|  | 6 |  | 2 | 1.9 |
|  | 7 |  | 5 | 2.6 |
|  | 8 |  | 10 | 3.0 |
|  | 9 |  | 20 | 3.4 |
|  | 10 |  | 30 | 3.5 |
| Comparative Examples | 1 | Glass optical fiber OM4_TIA/EIA 492-AAAD | 1 | 1.5 |
|  | 2 |  | 2 | 1.4 |
|  | 3 |  | 5 | 1.5 |
|  | 4 |  | 10 | 1.6 |
|  | 5 |  | 20 | 1.4 |
|  | 6 |  | 30 | 1.3 |

Looking at the $M^2$ factors of the Inventive Examples and the Comparative Examples as shown in Table 1, it is expected that all the Inventive Examples can obtain an $M^2$ factor of 1.7 or more.

Figure 5:
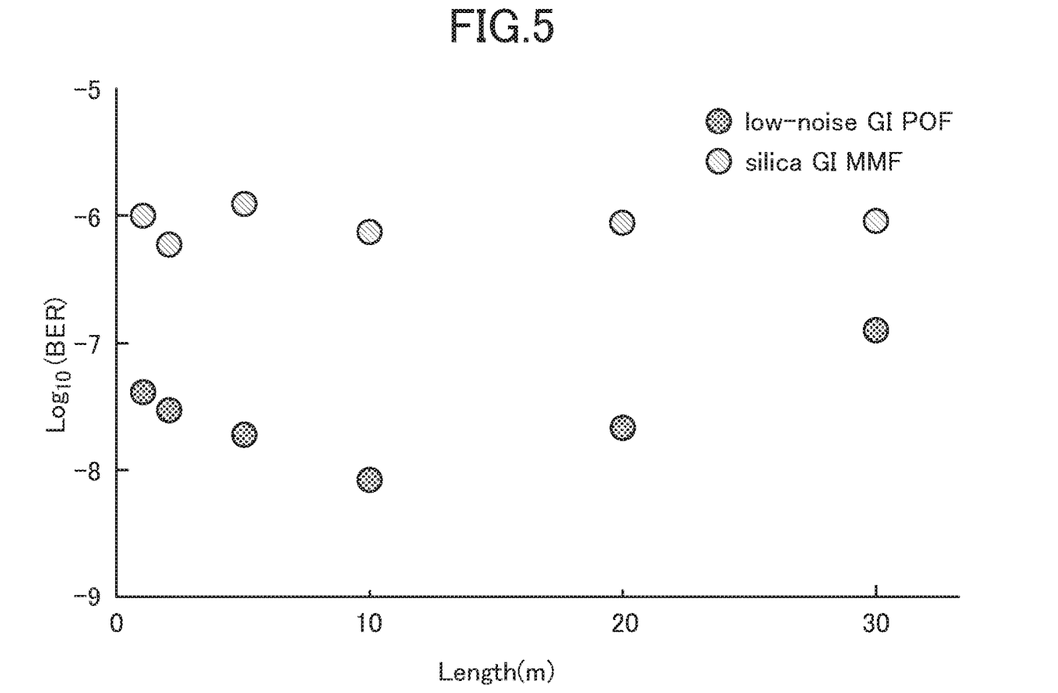
FIG. 5 is graph showing a comparison between respective logarithmic values of BERs of the multi-mode optical fiber according to the embodiment and the conventional optical fiber.

FIG. 5 is graph showing a comparison between respective logarithmic values of BERs of a multi-mode optical fiber according to one embodiment of the present invention and the conventional optical fiber, evaluated under axial excitation with a linearly-polarized approximate Gaussian beam. In the graph illustrated in FIG. 5, the vertical axis represents the logarithmic value of BER, and the horizontal axis represents the length of an optical fiber. Each of the plots of the "low-noise GI POF" shows the relationship between the logarithmic value of BER and the length of the optical fiber, when the length of the optical fiber is set to a respective one of 1 m, 2 m, 5 m, 10 m, 20 m and 30 m, which correspond, respectively, to Inventive Examples 5 to 10. Similarly, each of the plots of the "silica GI MMF" shows the relationship between the logarithmic value of BER and the length of the optical fiber, when the length of the optical fiber is set to a respective one of 1 m, 2 m, 5 m, 10 m, 20 m and 30 m, which correspond, respectively, to Comparative Examples 1 to 6.

As is evident from FIG. 5, the logarithmic values of BERs in the Inventive Examples 5 to 6 providing an $M^2$ factor of 1.7 or more are less than the logarithmic values of BERs in the Comparative Examples 1 to 6 providing an $M^2$ factor of less than 1.7. As above, in optical fiber cables using the Inventive Examples 5 to 10, the $M^2$ factor can be controlled at a specific value of 1.7 or more, so that it becomes possible to reduce a transmission loss which would otherwise occur along with a increase in higher-order mode due to mode coupling, and an influence of reflected return light from afar. As a result, the noise reduction becomes more dominant than the transmission loss, thereby providing enhanced transmission quality.

INDUSTRIAL APPLICABILITY

The optical fiber cable of the present invention is usable in the technical field requiring high-quality signal transmission in short-distance transmission.

The invention claimed is:

1. An optical fiber cable for use in optical communication based on transmitting an optical beam from a light-emitting device, to a light-receiving device, the optical fiber cable having: a proximal end which is one end thereof on the side of the light-emitting device, and a distal end which is the other end thereof on the side of the light-receiving device, wherein an optical beam returning from the side of the distal end toward the side of the light-emitting device has an $M^2$ factor of 1.7 or more; and a length of 100 m or less, wherein the optical fiber cable comprises a plastic optical fiber (POF), and wherein a core material for the plastic optical fiber (POF) includes a perfluorinated material, a partially fluorinated material, a partially chlorinated material, and a partially deuterated material.

2. The optical fiber cable as recited in claim 1, wherein the $M^2$ factor of the optical beam is 5.0 or less.

3. The optical fiber cable as recited in claim 1, which comprises a graded index (GI)-type optical fiber.

4. The optical fiber cable as recited in claim 1, wherein the core material comprises a dopant.

* * * * *